(12) United States Patent
Zollmann

(10) Patent No.: US 8,635,751 B2
(45) Date of Patent: Jan. 28, 2014

(54) MECHANICAL CLAMPING ELEMENT AND CLAMPING SYSTEM

(75) Inventor: Martin Zollmann, Sonnenbuehl (DE)

(73) Assignee: Zollmann GmbH, Burladingen (DE)

( * ) Notice: Subject to any disclaimer, the term of this patent is extended or adjusted under 35 U.S.C. 154(b) by 830 days.

(21) Appl. No.: 12/695,495

(22) Filed: Jan. 28, 2010

(65) Prior Publication Data

US 2010/0192344 A1    Aug. 5, 2010

Related U.S. Application Data

(60) Provisional application No. 61/151,004, filed on Feb. 9, 2009.

(30) Foreign Application Priority Data

May 4, 2009  (DE) .......................... 10 2009 006 520

(51) Int. Cl.
*B23P 19/04*   (2006.01)
*F16B 35/06*   (2006.01)
*B25B 13/48*   (2006.01)

(52) U.S. Cl.
USPC ............................. 29/256; 411/407; 81/176.2

(58) Field of Classification Search
USPC ............... 81/176.2, 176.15; 29/256; 411/332, 411/402–407, 325, 553; 7/138
See application file for complete search history.

(56) References Cited

U.S. PATENT DOCUMENTS

| | | | | | |
|---|---|---|---|---|---|
| 1,291,633 | A | * | 1/1919 | Allmon | 81/176.2 |
| 3,217,746 | A | * | 11/1965 | Voisine | 137/614.04 |
| 3,695,321 | A | * | 10/1972 | Garehime, Jr. | 81/448 |
| 4,572,039 | A | * | 2/1986 | Desjardins | 81/451 |
| 4,946,455 | A | * | 8/1990 | Rosen | 604/403 |
| D343,571 | S | * | 1/1994 | Von Seggern | D8/387 |
| 5,340,127 | A | * | 8/1994 | Martin | 279/20 |
| 5,626,435 | A | * | 5/1997 | Wohlhuter | 403/348 |
| 5,722,838 | A | * | 3/1998 | Czegledi | 411/407 |
| 7,152,510 | B2 | * | 12/2006 | Gerber | 81/176.15 |
| 7,347,126 | B2 | * | 3/2008 | Gerber | 81/176.15 |
| 7,494,311 | B2 | * | 2/2009 | Fuerle | 411/407 |
| 2001/0022118 | A1 | * | 9/2001 | Zollmann | 81/176.15 |

* cited by examiner

*Primary Examiner* — Lee D Wilson
*Assistant Examiner* — Jamal Daniel
(74) *Attorney, Agent, or Firm* — Lucas & Mercanti, LLP; Klaus P. Stoffel

(57) ABSTRACT

A clamping system with a clamping nut and a wrench for tightening the clamping nut, wherein the clamping nut includes at least one recess on either the outside edge or the inside edge of the end face of the clamping nut to receive projections of the wrench. The edge opposite the edge with at least one recess is closed. The at least one recess is provided with at least one undercut, which the projections of the wrench can grip from underneath.

18 Claims, 19 Drawing Sheets

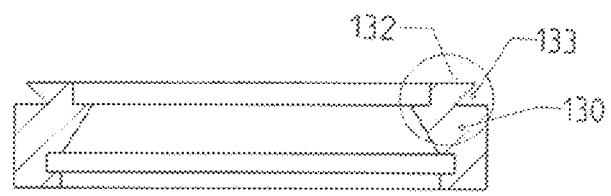
Fig. 13
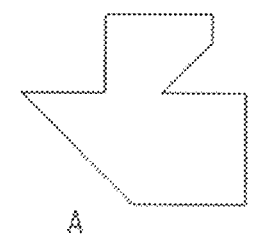
A
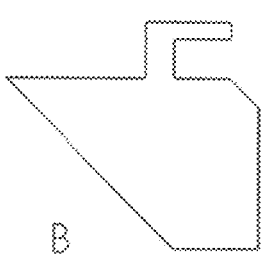
B
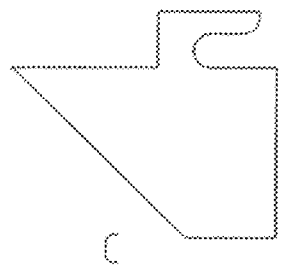
C
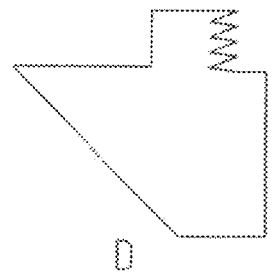
D
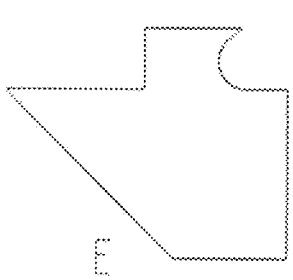
E
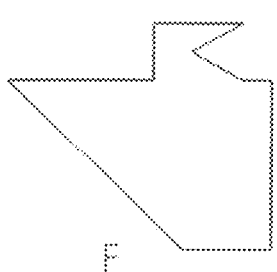
F
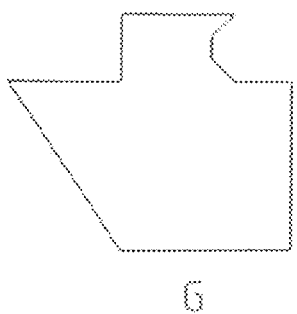
G
Fig. 14

MECHANICAL CLAMPING ELEMENT AND CLAMPING SYSTEM

BACKGROUND OF THE INVENTION

The invention pertains to a clamping system with a clamping nut and a wrench for tightening the clamping nut, to a mechanical clamping element, and to the use of an undercut profile.

Various mechanical clamping elements are already known. Clamping nuts are used, for example, to clamp collet chucks, which are used to clamp tool shafts in the tool holder of a machine tool. Especially in cases where space is limited and access to the clamping element is narrow, special measures must be taken to ensure that the necessary force for clamping can be exerted. In the conventional method, clamping is carried out with a wrench, which, for example, is equipped with pins, which engage in hole-like recesses in the clamping nut, so that the wrench can be used to tighten the clamping nut. German Utility Model DE 296 08 677 U1 describes, for example, a clamping nut with slot-like recesses, in which the pins of a wrench can engage.

To prevent the wrench from slipping off, European Patent Application EP 1 052 047 A2 describes a clamping nut which provides groove-like recesses for the engagement of the pins arranged on a clamping wrench. The grooves are formed with a dovetail-shaped cross section, so that the pins of the wrench, the profile of which is complementary to that of the grooves, can grip the undercut of the grooves, which prevents the wrench from sliding off. Undercuts of other types have also already been described. Thus, for example, German Application Publication No. DE 103 02 529 A1 describes a comparable clamping nut, in which the grooves comprise an undercut with an S-shaped profile. It is true that, as a result of the undercut profile of the grooves, it is possible to stabilize the nut on the wrench to a certain degree, but it is still impossible to prevent the nut from sliding laterally off the wrench under all conditions. As a solution to this problem, German Utility Model DE 201 19 008 U1 proposes that the collar of the clamping nut be provided with a separate locking ring, which is intended to prevent the wrench from shifting or sliding laterally out of the grooves. This separate element for locking the nut, however, is complicated and cumbersome in practice and is therefore not a suitable way of solving the problem.

SUMMARY OF THE INVENTION

The invention is directed toward a mechanical clamping element or clamping system with a clamping nut and with a wrench which does not suffer from the disadvantages described above and which makes it possible to clamp a mechanical clamping element reliably without slipping and with minimal expenditure of force.

The inventive clamping system comprises a clamping nut or mechanical clamping element and a wrench for tightening the clamping nut. The clamping nut comprises on one of its end faces at least one and preferably two or more recesses, which are provided to receive projections on the wrench. The recesses are arranged either on the outside edge or on the inside edge of the clamping nut, wherein the opposite edge, that is, the inside edge in the former case or the outside edge in the latter case is closed. As a result, the projections of the wrench can be introduced from the outside or from the inside to engage in the recesses in the clamping nut. The recesses in the inventive clamping nut or of the inventive clamping system are provided with at least one undercut, which can be gripped by the projections of the wrench. This ensures that the wrench will engage without slipping. In particular, the undercut prevents the nut from falling out of the wrench. The closed area of the end face of the clamping nut, whether on the inside edge or on the outside edge, increases the stability of the clamping nut, so that, for example, elevations extending from the end face will not fracture, as happens in the case of clamping nuts according to the prior art. In addition, the closed end face of the clamping nut, whether on the inside or on the outside, prevents the wrench from shifting or slipping laterally or radially out of the recesses.

In an especially preferred embodiment of the inventive clamping system, the recess has the form of a slot with two narrow sides and two long sides, wherein one of the long sides is closed and one of the long sides is open. In the case of recesses on the outside edge, the outer long side is open, thus corresponding to the outside circumference of the clamping nut. In the case of recesses on the inside edge, the inner long side of the opening is open, thus corresponding to the circumference of the inside edge of the clamping nut. The long side of the recess opposite this open side is provided with at least one undercut. The narrow sides can also comprise one or more undercuts. In an especially preferred embodiment, the narrow sides of the recesses comprise no undercuts; that is, at least part of the edge or inner surface of the narrow sides is perpendicular or at a right angle to the surface of the end face of the clamping nut. In the following, the design of the inner surfaces or inner edges of the recesses is also referred to as the "profile". The narrow sides of the recesses are the surfaces where the wrench actually makes contact when it tightens or loosens the clamping nut. These are the areas at which torque is transmitted. In comparison to the undercut profiles of these contact surfaces of the known clamping nuts, the flat contact surfaces of the invention make it possible for the projections of the wrench to engage much more effectively during the transmission of force. Torque can therefore be transmitted much more efficiently. As a result of the inventive design of the narrow sides of the recess, furthermore, the surfaces on which the force acts are always engaged with an exact fit, which means that there will be no deformation or digging-in and thus no wear or damage to these contact surfaces.

The narrow sides preferably have an expanded opening in the form of part of a circle or some other shape, wherein preferably the expansion of the narrow side in the form of part of a circle or some other shape is realized without an undercut. Increasing in this way the size of the contact surface for the projections of the tightening wrench for the transmission of force improves the torque transmission even more.

In an especially preferred embodiment of the inventive clamping system, the undercut long edge of the recess comprises at least one section without an undercut, especially a central section without an undercut, and two sections with undercuts. The sections with undercuts are preferably next to the central section, one on each side. For example, the closed long side of the recess can comprise a three-part division of the profile, the three sections being approximately equal in length. The profile of the central section can be essentially at a right angle to the surface of the end face of the clamping nut. It is especially preferred for this section to comprise one or more upward-facing bevels. This central section facilitates the introduction of the projections of the wrench and guides and positions them. This guidance can be improved even more in particular by the upward-facing bevels. After the projections of the wrench have been introduced via the central section, the wrench is turned slightly by the user in the clockwise or counterclockwise direction, as a result of which the projections of the wrench engage in the one or the other undercut or grooved section of the recess. In this position, the nut is secured in the wrench by the undercut and cannot fall out after, for example, the nut has been loosened. After the wrench has been secured in position, the force for tightening or loosening the clamping nut can be applied, wherein this force, even very powerful torques, can be transmitted easily by way of the essentially right-angled profile of the narrow sides.

The central section without an undercut preferably forms an opening in the recess, which expands radially toward the inside or radially toward the outside, depending on whether the recess is located on the outside edge or on the inside edge. This has the result of making available a larger engagement surface for the projections of the wrench, which makes it easier to introduce the wrench.

The above-described design of the recesses and of the undercut profile of the recesses makes it possible for the projections of the wrench to be introduced in user-friendly Cashion into the recess(es) of the clamping element, wherein the wrench is positioned properly by turning it slightly in the clockwise or counterclockwise direction, the projections of the wrench thus being guided into the sections with undercuts, wherein the wrench is prevented from sliding out or slipping off. In this position, the projections of the wrench engage in an essentially positive manner with one of the narrow sides of the recesses with its essentially flat, right-angled profile, so that the force required to tighten or to loosen the clamping nut can be applied, namely, in the direction of rotation, in an especially advantageous manner. The wrench cannot be forced out of engagement, nor can the wrench become jammed in the clamping nut.

The undercut of the profile can be realized as a so-called dovetail undercut, essentially in the form of a "Z". In other designs, the undercut can be bent one or more times in the form of an "S", or have one or more teeth, or have some other type of undercut shape.

The projections on the wrench are, for example, pins or lobes, which are designed to fit into the profile of the recesses. The lateral surfaces of the projections of the wrench preferably comprise flat or right-angled sections and sections with undercut profiles, which are complementary to the profile of the recesses. The projections, when viewed from above, can be more-or-less oval with two long sides and two narrow sides, wherein the long sides can comprise a profile complementary to the undercut profile of the recesses of the clamping nut, and the narrow sides can comprise an essentially right-angled profile or a profile without an undercut. With respect to their longitudinal dimension, the projections are preferably smaller than the recesses in the clamping nut, so that the projections can be introduced into the recess and turned to the right or to the left so that they can engage in the undercut in question. The wrench can be a conventional wrench with a handle projecting from it at a right angle or a wrench, for example, in the form of a socket attachment.

In one embodiment of the inventive clamping system, the clamping nut comprises only one recess with the previously described profile. To facilitate the centering of the wrench and to provide sufficient contact points for the wrench to exert the required force, it is possible here to provide the side of the end face of the clamping nut opposite the recess, for example, with a support point for the wrench. In other embodiments, two or more recesses are provided. When two or more recesses are present, the total contact surface for the wrench is increased, which has the effect of improving the force transmission for tightening or loosening the clamping nut. In addition, the arrangement of two or more recesses improves the centering and stability of the clamping system. The two or more recesses are preferably arranged symmetrically with respect to each other.

The clamping nut preferably comprises an outside thread and/or an inside thread and can be used, for example, to clamp a tool shaft in the tool holder of a machine tool by means of a collet chuck.

The inventive clamping nut can also be used, for example, as a sealing nut, wherein a sealing disk is inserted into the clamping nut from the inside, for example, or from the front, to seal off a shaft, a tool shaft, or the like which has been inserted into the central hole of the clamping nut. To ensure a good seal, an appropriate sealing disk can be equipped with a conventional O-ring, a square ring, or a V-shaped ring of elastic material. A vulcanized sealing disk, for example, can also be used as a sealing disk.

The undercut profile described above is also suitable for a large number of other mechanical clamping elements or screw elements in which a tool is intended to engage in slip-proof fashion and to transmit torque effectively. The invention therefore also comprises a mechanical clamping or screw element with at least one recess provided with an undercut profile for the slip-proof engagement of a clamping or screwing tool, a wrench, which element is characterized in that the recess comprises two narrow sides preferably without undercuts and two long sides, one closed and one open, wherein the closed long side comprises in profile at least one undercut. The closed long side of the recess preferably comprises a central section without an undercut and two sections with undercuts. It is especially advantageous for the central section without an undercut to increase the size of the recess. The inventive mechanical clamping element can be a clamping ring, a locking ring, a clamping element, a screw, or the like in any one of various forms such as a hex screw. The inventive mechanical clamping element can be used advantageously especially in cases where a clamping tool is intended to act on a clamping or screw element in a space-saving manner, wherein the clamping of the clamping element should be accomplished without slipping and with effective transmission of the torque. With respect to additional features of the mechanical clamping element, reference is made to the description provided above.

The invention also comprises the use of an undercut profile in the manner described above for a mechanical clamping element to make possible the slip-proof engagement of a clamping tool for the purpose of effective torque transmission. The inventive undercut profile can, for example, be arranged in edge-resident recesses of the mechanical clamping element, such as on the head of a screw or on a clamping ring, in the manner described above. In other embodiments, the inventive undercut profile can be formed in recesses which are arranged on an inside edge of an inside hole, such as in the case of a clamping ring.

The invention also comprises a wrench for tightening a clamping nut, wherein the wrench comprises projections for engaging in the recesses of the clamping nut, and wherein the projections comprise lateral areas or lateral surfaces with an approximately right-angled profile and sections with a profile complementary to the undercuts of the recesses of the clamping nut. With respect to additional features of the inventive wrench and the profile of the projections of the wrench, reference is made to the description provided above.

Additional features and advantages of the invention can be derived from the following description of the figures in conjunction with the exemplary embodiments. Each of the various features can be realized by itself, or different features can be combined with each other.

BRIEF DESCRIPTION OF THE DRAWINGS

FIG. 13 shows a cross-sectional view of another embodiment of the inventive clamping nut to illustrate the undercut profile;

FIG. 14 shows cross sections of various exemplary embodiments of undercut profiles;

DETAILED DESCRIPTION OF THE INVENTION

Figure 1:
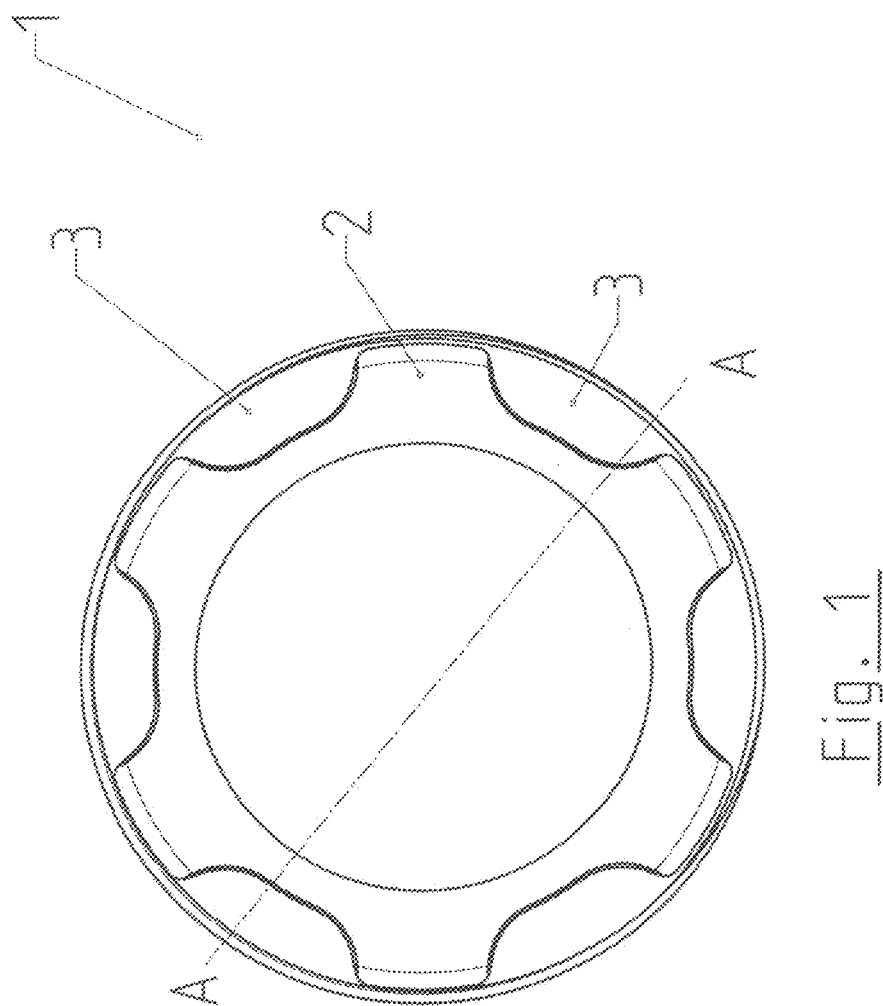
FIG. 1 shows a top view of an inventive clamping nut.
Figure 2:
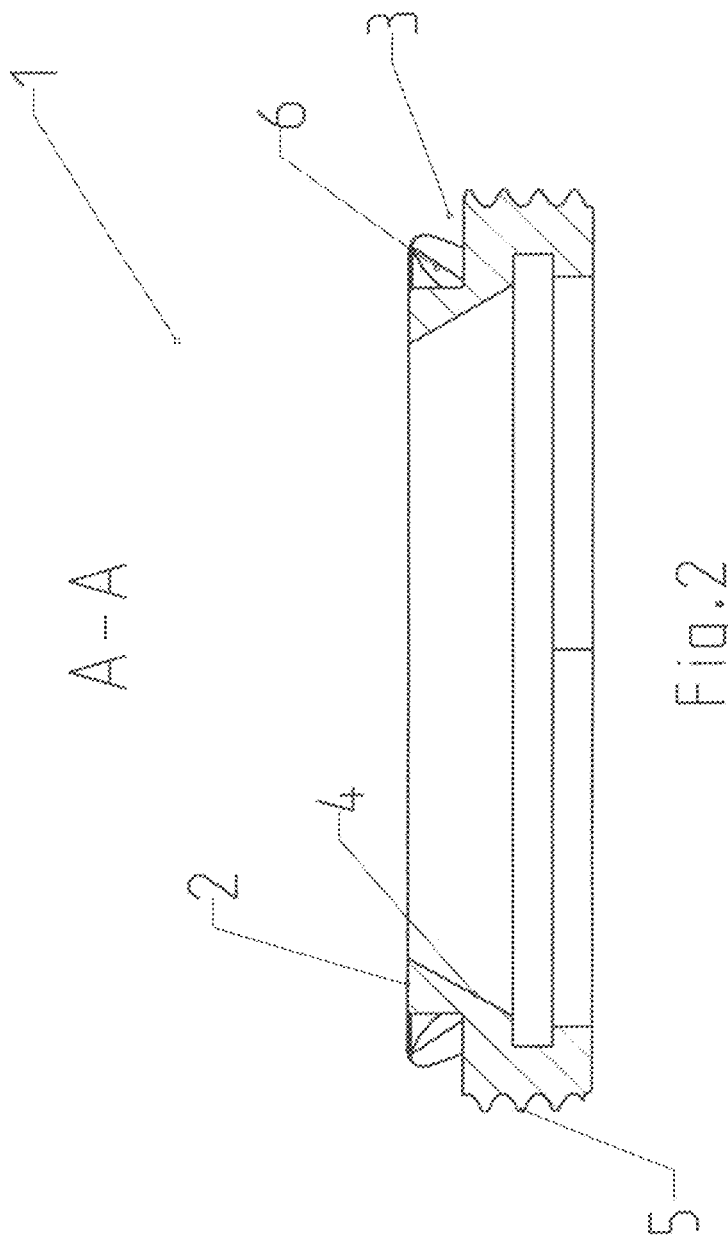
FIG. 2 shows a cross-sectional view of the clamping nut of FIG. 1 along line A-A.

The top view of an inventive clamping nut 1 in FIG. 1 shows the end Face 2 of the clamping nut with six recesses 3. The recesses 3 are arranged on the outside edge, and the end face 2 is closed on the inside edge. The cross-sectional view along line A-A, shown in FIG. 2, shows an internal cone 4 for the centered gripping of a collet chuck, for example, and an outside thread 5, for example, so that the nut can be screwed into the holder of a machine tool spindle or into a tool holder. The undercut 6 in the profile of the recess 3 can be seen in the cross-sectional view. The end face 2 of the clamping nut 1, which is closed on the inside edge, guarantees the stability of the clamping nut 1, wherein the undercuts 6 in the recesses 3 make it possible for the wrench to engage the nut in a slip-free manner. In addition, the closed inside-edge of the end face 2 prevents the clamping nut from slipping laterally out of the wrench.

Figure 3:
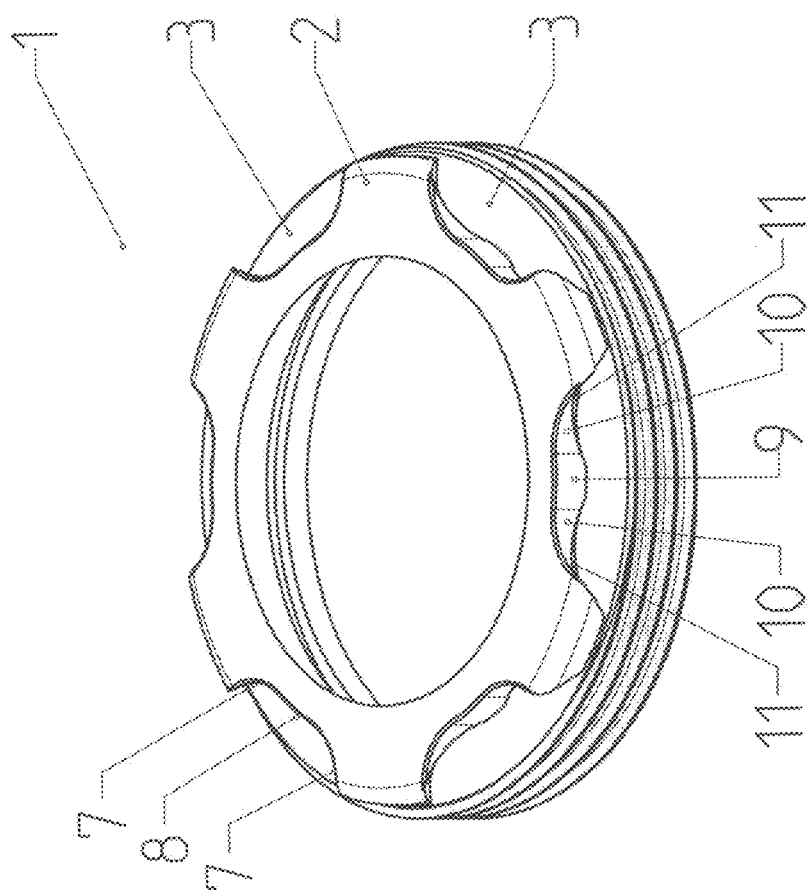
FIG. 3 shows an isometric view of the clamping nut of FIG. 1.

FIG. 3 shows an isometric view of the inventive clamping nut at an angle from above. The recesses 3 in the end face 2 of the clamping nut 1 are designed more-or-less as slots, each comprising two narrow sides 7, an open long side (not designated), and a closed long side 8. The closed long side 8 is subdivided into a central section 9 and the two adjacent sections 10. The inner surface or edge of the section 9 has a flat profile in the vertical direction and is at a right angle to the end face 2. This section with the right-angled profile serves as an orientation point, which facilitates the introduction of the projections of the wrench into the recesses of the clamping nut. By slightly turning the wrench, the projections of the wrench are guided into the sections 10 either on the left or on the right of the central section 9 and grip under or behind the undercuts 11 of the profile in the sections 10, as a result of which the clamping nut 1 is prevented from slipping from or falling out of the wrench.

Figure 4:
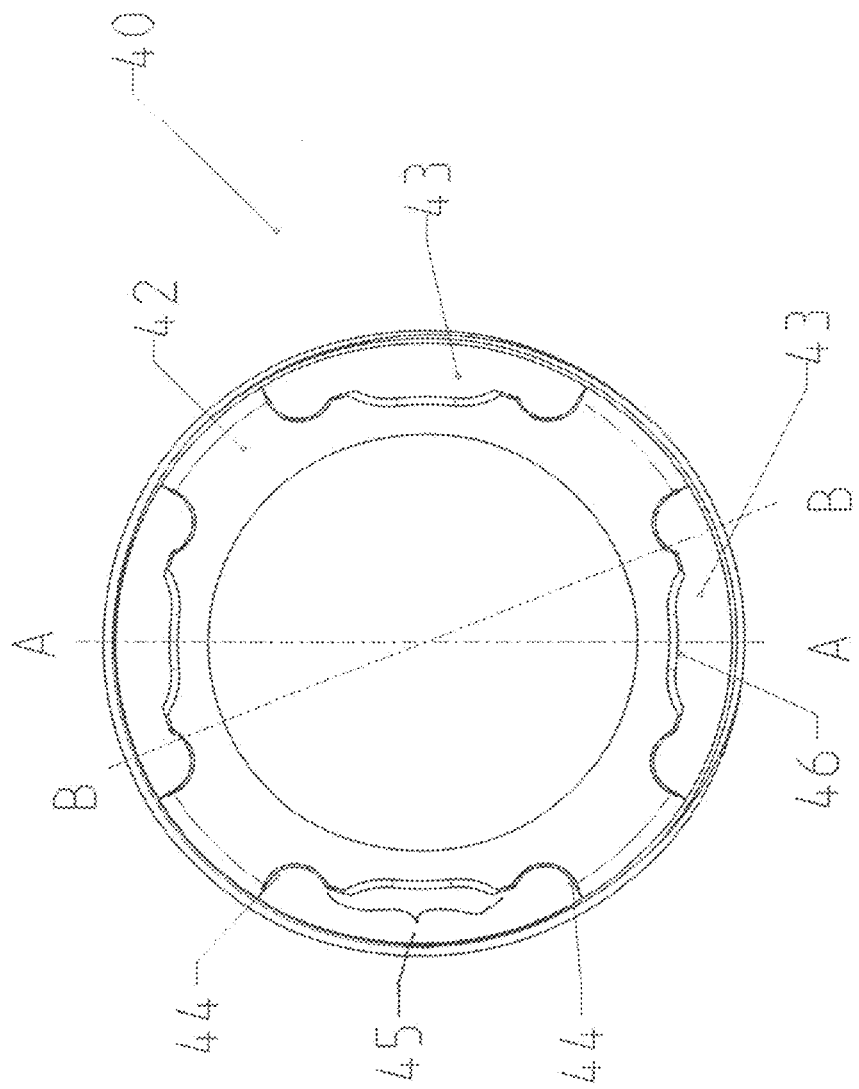
FIG. 4 shows a top view of another embodiment of an inventive clamping nut.
Figure 5:
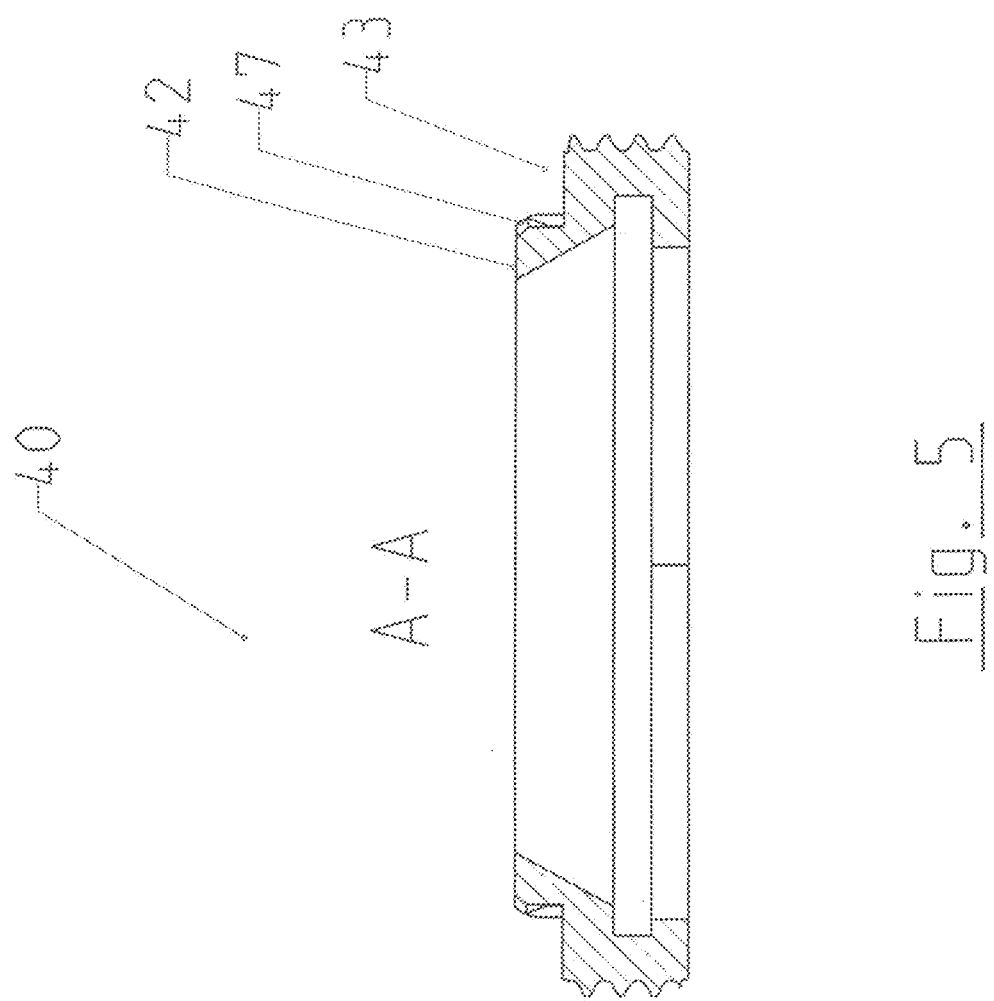
FIG. 5 shows a cross-sectional view of the clamping nut of FIG. 4 along line A-A.

FIG. 4 shows a top view of an especially preferred and advantageous embodiment of an inventive clamping nut 40. The end face 42 of the clamping nut 40 is interrupted by recesses 43 in the outside edge. These recesses are provided for the engagement of the projections of a wrench, thus making it possible for the wrench to tighten or to loosen the clamping nut. The recesses 43 comprise two narrow sides 44, an open long side (not designated), and a closed long side 45. The narrow sides 44 comprise an opening, which is expanded in the form of part of a circle. The closed long side 45 comprises a central section 46, which increases the size of the recess 43 in the radially inward direction. FIG. 5 shows a cross section of the clamping nut 40 along line A-A of FIG. 4. The cross-sectional line leads through the central section 46 within the long side 45 of the recess 43. The essentially vertical or right-angled profile in this section 46 can be seen in this cross-sectional view, wherein the profile is formed with a small bevel 47, facing upward, that is, in the direction of the end face 42 of the clamping nut 40. This form or profile of the central section 46 within the recess 43 serves as an orientation point for the placement of the wrench and serves to guide the projections of the wrench and to simplify the positioning of the wrench.

Figure 6:
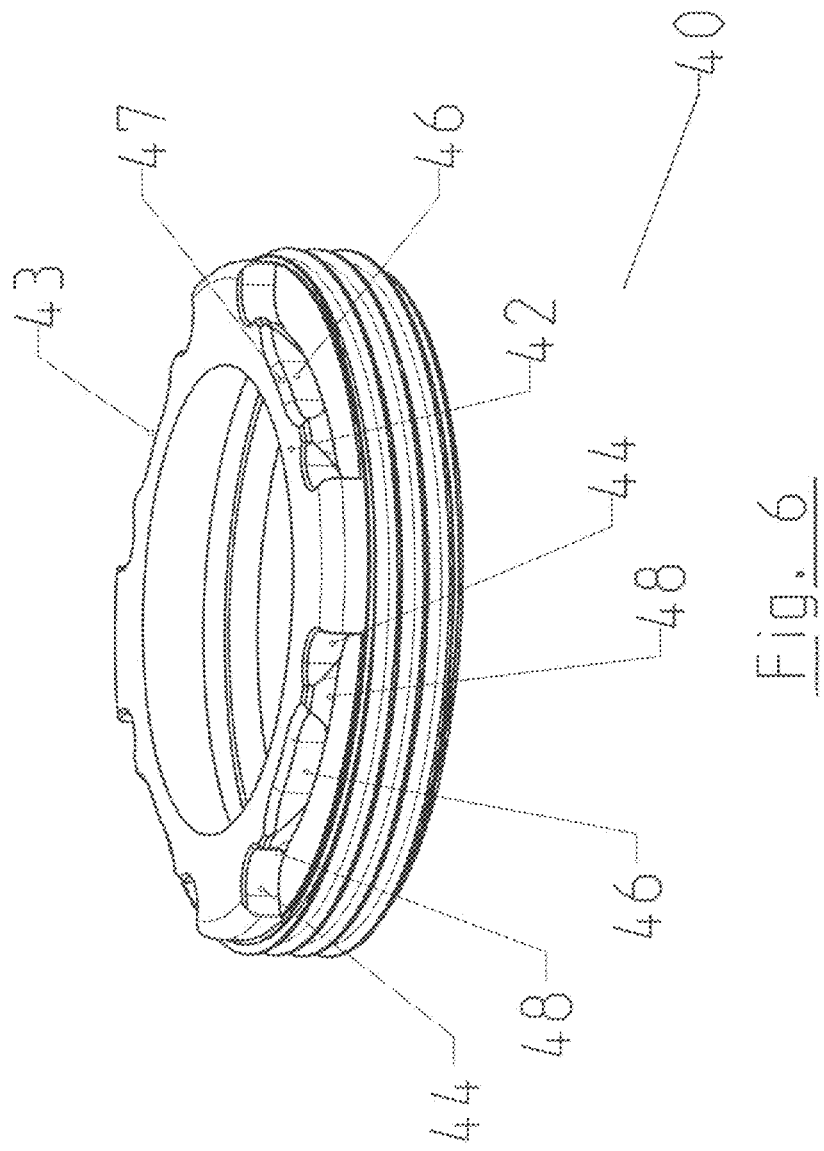
FIG. 6 shows an isometric view of the clamping nut of FIG. 4.

FIG. 6 shows an isometric view, at an angle from above, of the inventive clamping nut 40. The central section 46 within the closed long side of the recess 43 with the right-angled profile and the bevel 47 in the area facing the end face 42 can be seen clearly. Also illustrated in this diagram are the narrow sides 44 of the recess 43, which do not comprise an undercut and instead comprise a flat profile in the vertical direction. That is, they comprise an essentially right-angled profile relative to the end face 42. The narrow sides 44 of the recess 43, which are expanded to form parts of a circle, are the areas where the force is transmitted when the wrench is turned to tighten or to loosen the clamping nut 40. As a result of this shape of the profile in the areas 44, a positive connection is established between the projections of the wrench and the sections 44, without the possibility of the occurrence of jamming or imprecise seating. As a result, the transmission of the torque is considerably improved, so that the operator does not need as much force to tighten or to loosen the clamping nut 40. The sections 48 with their undercuts are located in the closed long sides of the recesses 43, one on each side of the central section 46. These undercuts serve to secure the projections of the wrench. After the projections of the wrench have been introduced into the recesses 43 via the central section 46, the projections are guided into the right or left section 48 with an undercut by the slight turning of the wrench, wherein, as a result of the gripping of the associated undercuts by the projections of the wrench, the clamping nut 40 is prevented from falling out or slipping laterally out of the wrench.

Figure 7:
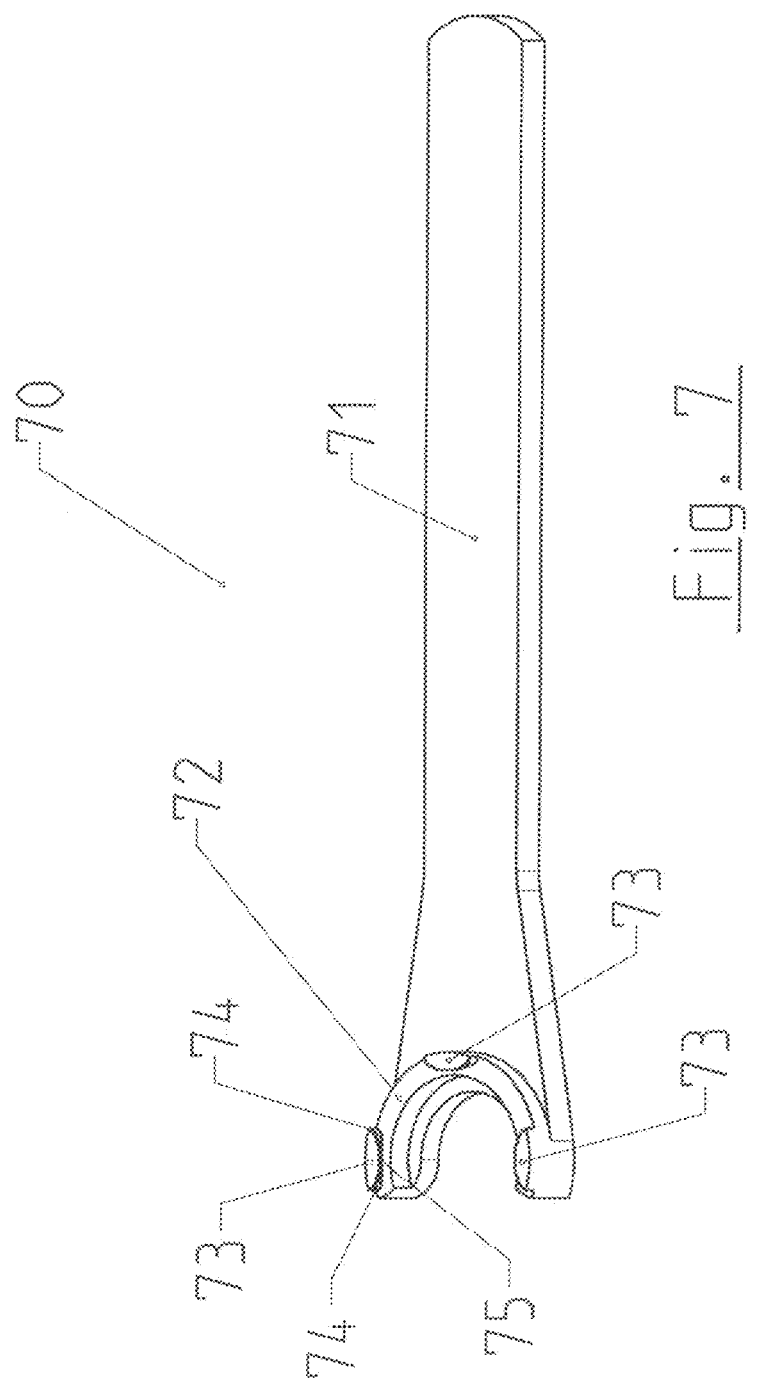
FIG. 7 shows an isometric view of a wrench.

FIG. 7 shows a clamping wrench 70, which can be used to clamp an inventive clamping nut or an inventive clamping element. The wrench 70 comprises a head part 72 of an approximately semicircular shape and a handle part 71. Projections 73, which are adapted with respect to their size and profile to an inventive clamping nut, are arranged on the semicircular collar of the head part 72. With respect to their longitudinal dimension, the projections 73 are smaller than the recesses of an inventive clamping nut. The narrow sides 74 of the projections 73 preferably do not comprise an undercut and have an essentially vertical or right-angled profile. The long sides 75 of the projections 73, which point inward toward the center of the semicircular shape of the head part 72, comprise a profile essentially complementary to the undercut sections of the clamping nut, so that these sections can grip the undercuts of the recesses of the clamping nut. With respect to their size, the projections 73 of the wrench 70 are preferably designed so that each one fills approximately half of the surface area of a recess of the clamping nut and so that, after they have been introduced into the recesses of the clamping nut, they can be turned with an exact fit into the left or into the right section of the closed long side of the recess of the clamping nut.

Figure 8:
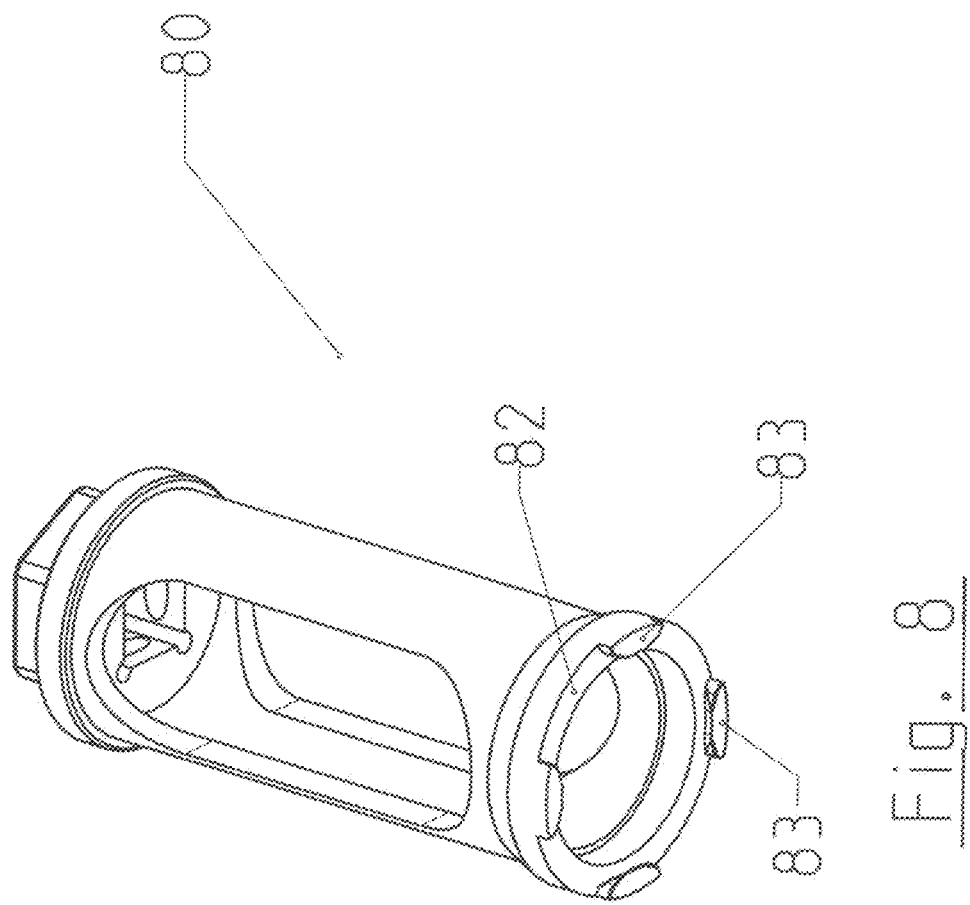
FIG. 8 shows an isometric view of a socket-like design of a wrench.

FIG. 8 shows another wrench 80, which can be used to loosen or to tighten an inventive clamping nut or an inventive clamping element. The wrench 80 is designed in the form of a socket or driver, and comprises in its lower section a circular collar 82 with several projections 83, which are arranged on the outside circumference of the collar 82. These projections 83 are comparable in design to the projections 73 of the wrench 70 illustrated in FIG. 7 and are intended to engage in the recesses of an inventive clamping element or clamping nut.

Figure 9:
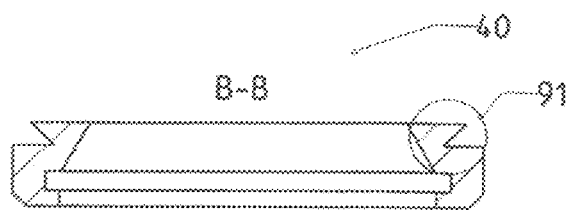
FIG. 9 shows a cross-sectional view of an inventive clamping nut to illustrate the undercut profile.
Figure 10:
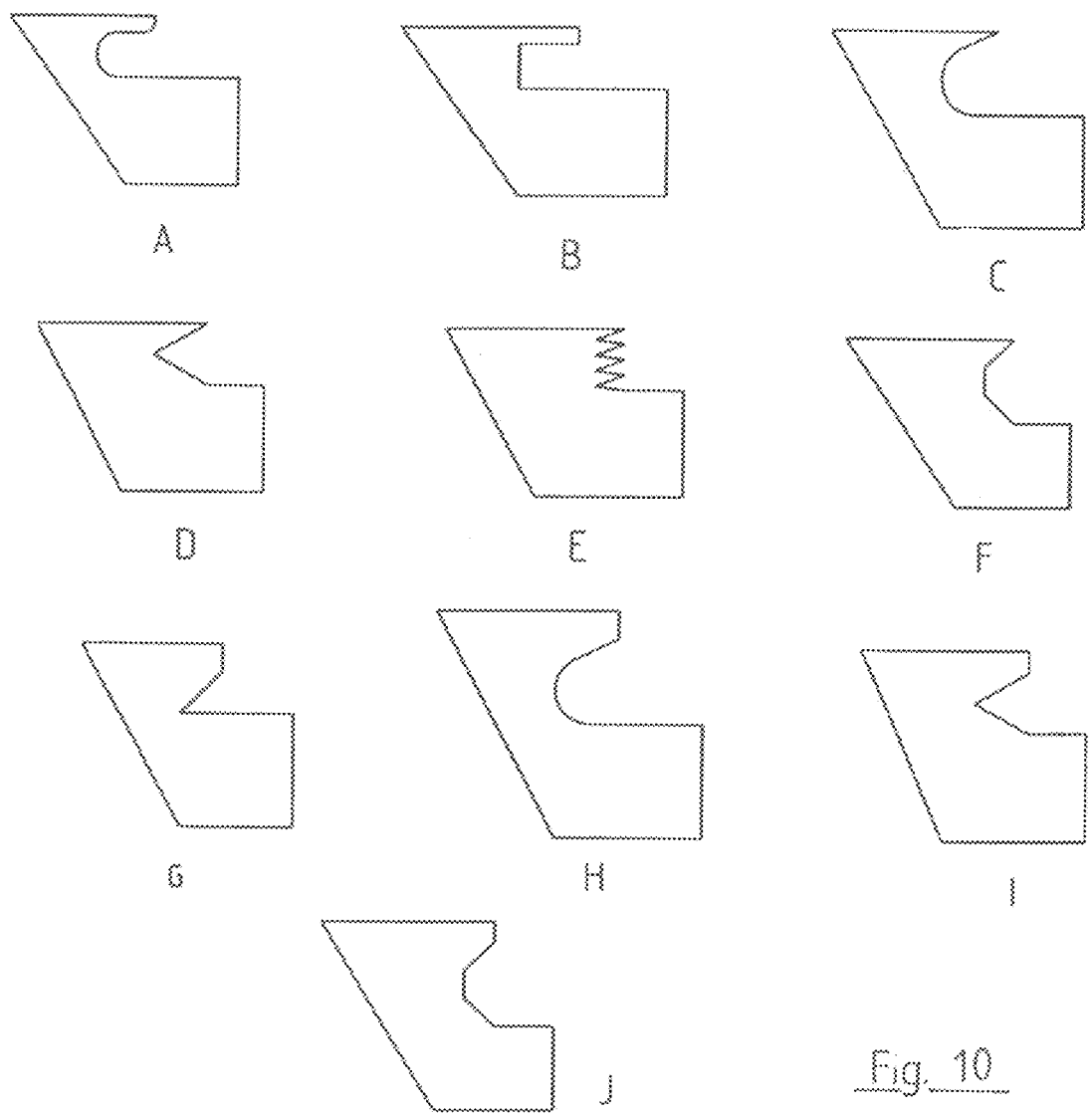
FIG. 10 shows cross sections of various exemplary embodiments of undercut profiles.
Figure 11:
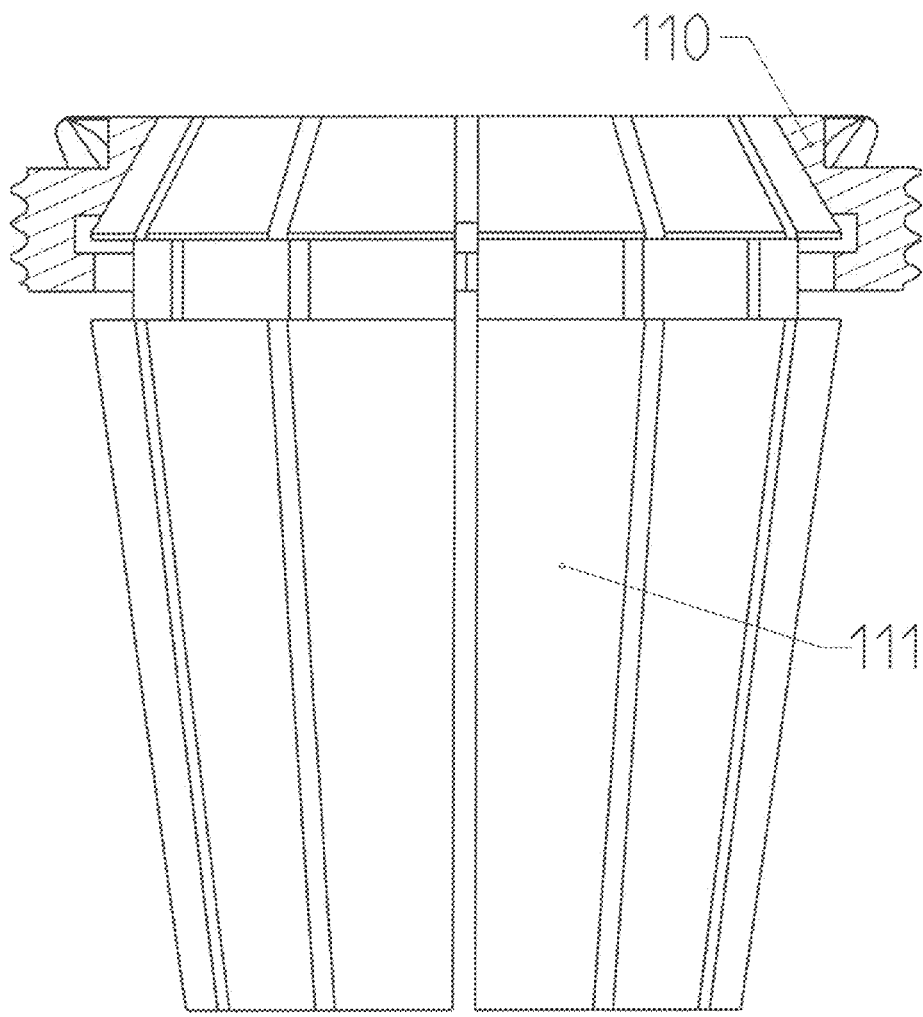
FIG. 11 shows a cross-sectional view of an inventive clamping nut with collet chuck.
Figure 12:
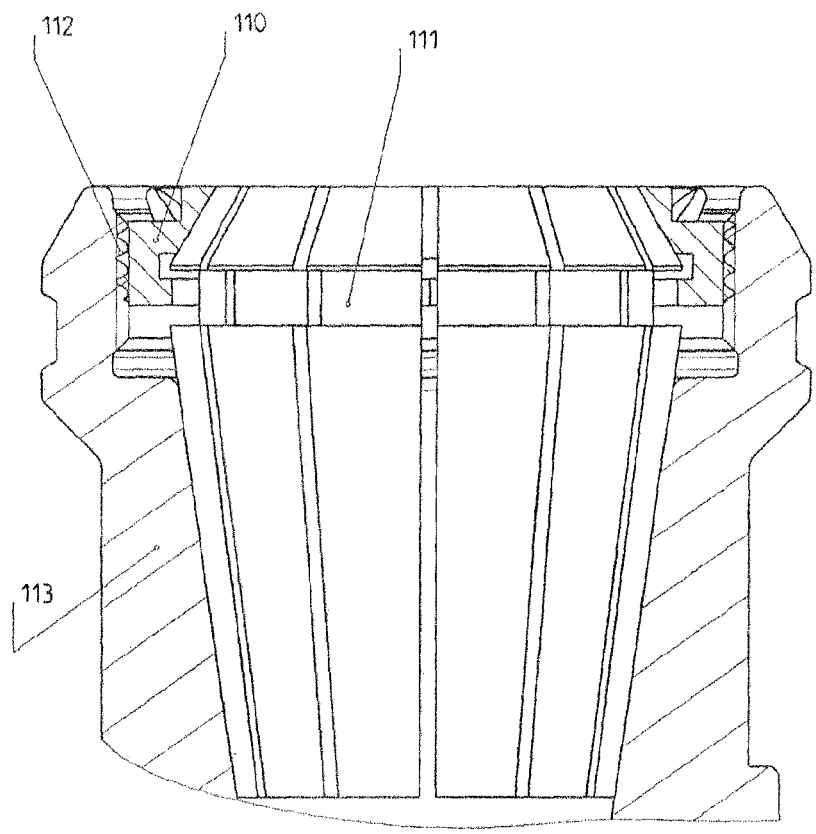
FIG. 12 shows a partial cross section of the inventive clamping nut with the collet chuck of FIG. 11 in a tool holder.

FIG. 9 shows a cross section through an inventive clamping nut along line B-B of clamping nut 40 shown in FIG. 4 to illustrate the undercut areas 91 of a recess according to the invention. The undercut of the recess can be designed as a dovetail. In other embodiments, which are illustrated in FIG. 10, A to J, the undercut area or areas of the recess can comprise an S-shaped profile with one or more bends, polygonal profiles, or profiles with one or more teeth. FIG. 11 shows a cross section through an inventive clamping nut 110, which surrounds a collet chuck 111. The collet chuck 111 is, for example, used to clamp the shafts of tools. Here, the clamping nut 110 and the collet chuck 111 are flush with each other at the top; that is, the end face or upper edge of the clamping nut 110 is flush with the end face of the collet chuck 111. FIG. 12 shows another view of the clamping nut 110 and of the collet chuck 111 in partial cross section. The collet chuck 111 is mounted in a tool holder 113 of a machine tool or the like by the outside thread 112 of the clamping nut 110.

Figure 15:
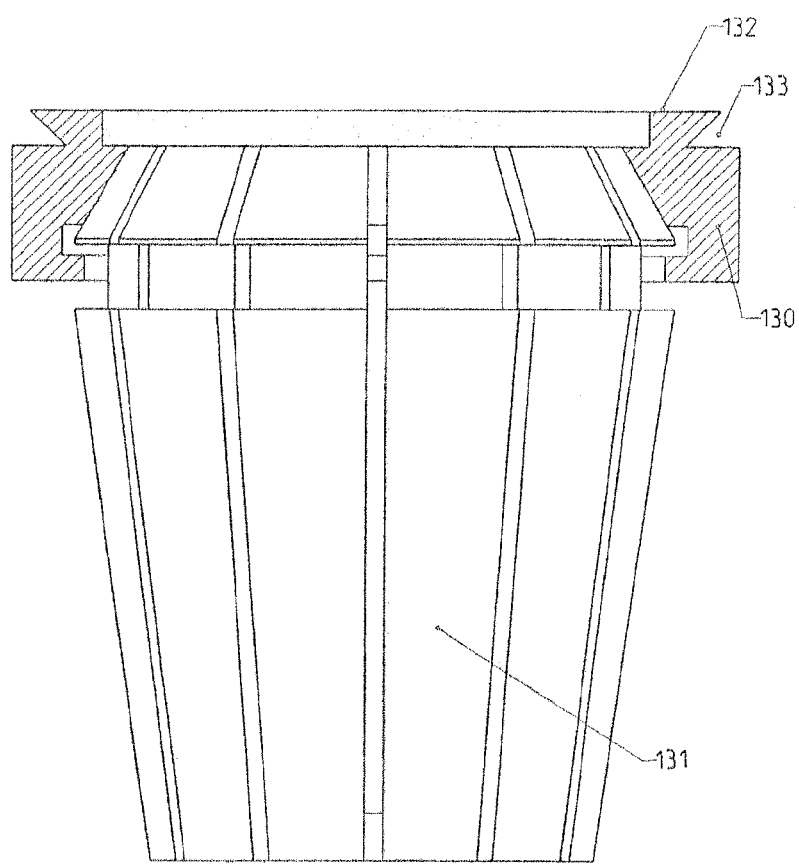
FIG. 15 shows a cross-sectional view of the inventive clamping nut of FIG. 13 with collet chuck.

FIG. 13 shows a cross section through another inventive clamping nut 130 with undercut sections 133 of the recess. The end face 132 of the clamping nut 130 is not flush with the upper edge of a collet chuck to be inserted into it but rather projects beyond the top surface of the collet chuck. The recesses 133 with the undercut areas of the clamping nut 130 lie above the top surface of the collet chuck 131 to be inserted. Figures A-G of FIG. 14 show various possible designs of the undercut sections with various prong-like and arc-like forms of the undercuts. FIG. 15 shows a cross section of the embodiment of the inventive clamping nut 130 of FIG. 13, here surrounding a collet chuck 131. It is clear from this diagram that the upper edge of the collet chuck 131 is not flush with the end face of the clamping nut. The end face 132 of the clamping nut 130 projects beyond the collet chuck 131.

Figure 16:
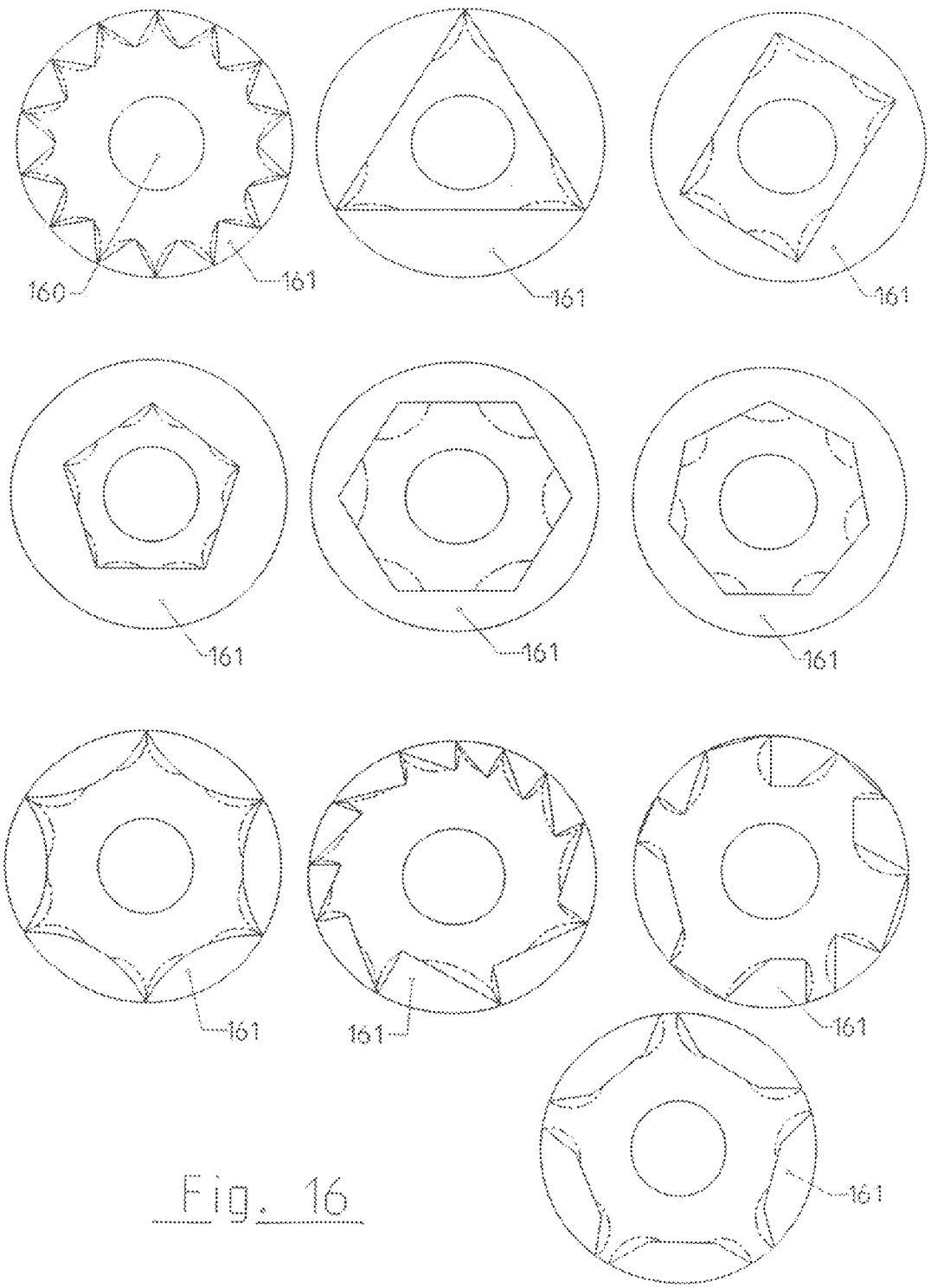
FIGS. 16 and 17 show top views of various exemplary embodiments of the inventive clamping elements in which the recesses are on the outside edge.
Figure 17:
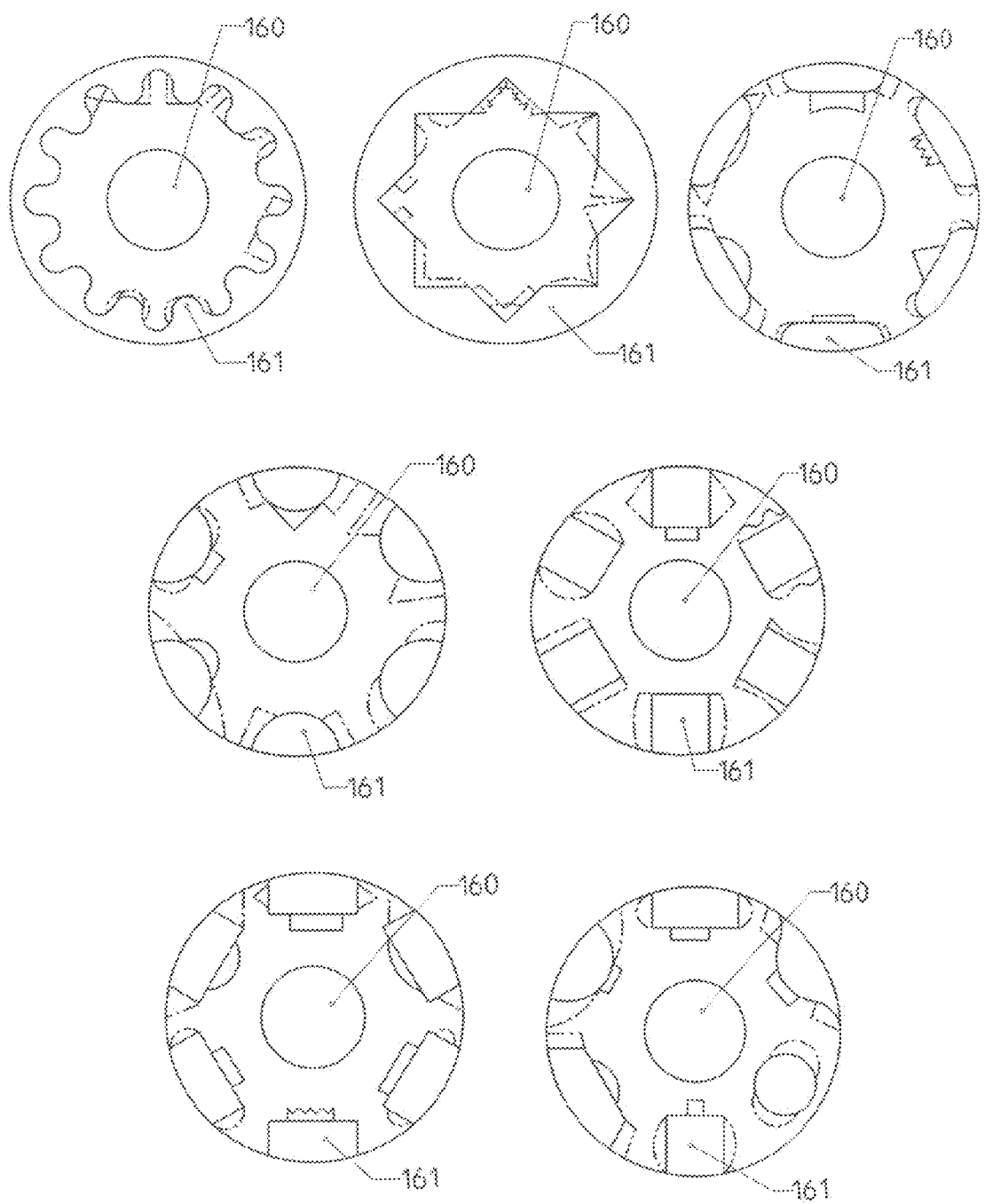

FIGS. 16 and 17 show top views of various embodiments of inventive clamping elements with a central opening 160 and recesses 161 in the outside edge. The recesses 161 in the end face of the illustrated top views of a clamping nut or of a clamping element can be prong-like, arc-like, or of some other shape, wherein according to the invention the recesses are preferably designed section by section with undercuts in the manner previously described. These undercuts are indicated by the broken lines.

Figure 18:
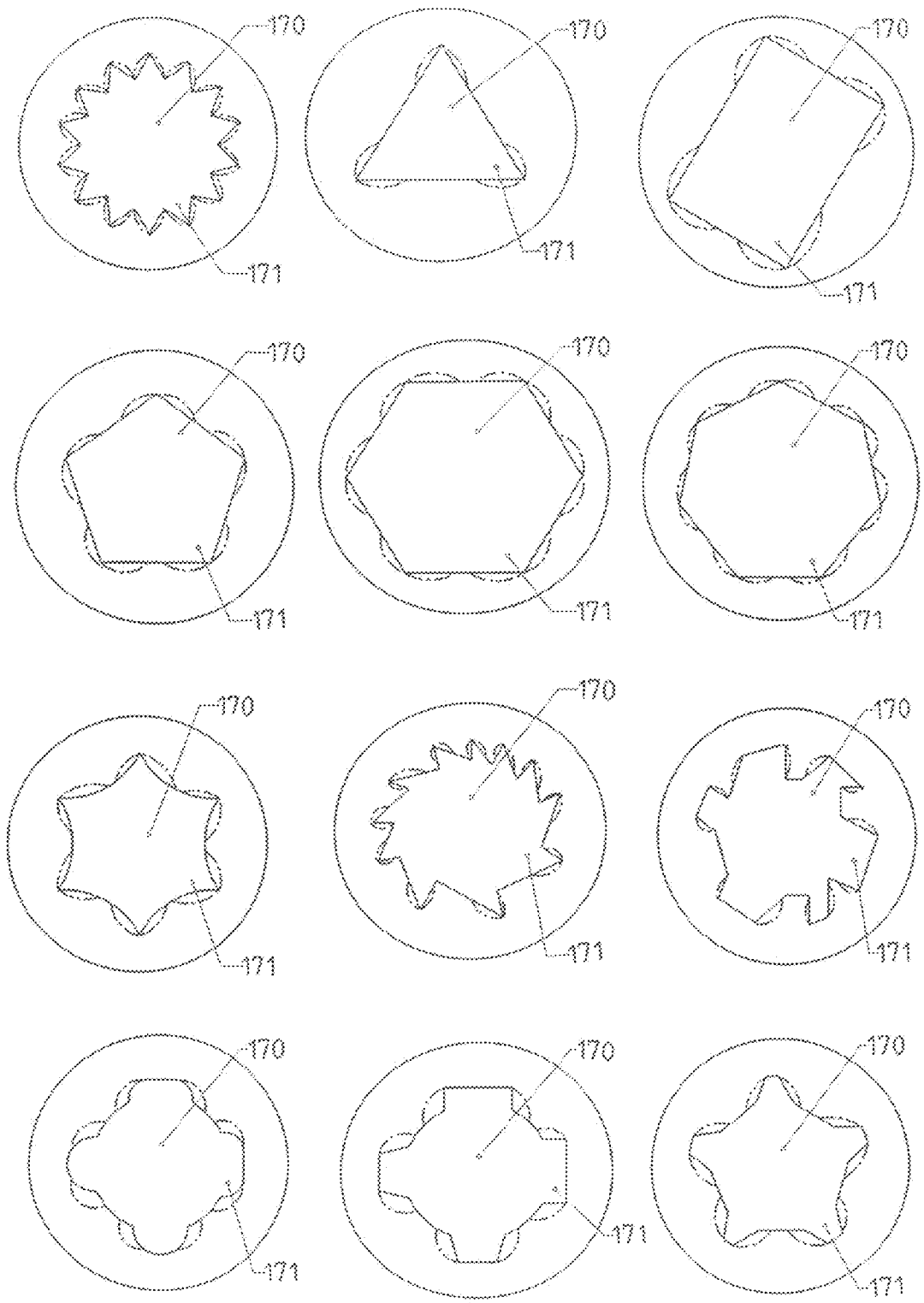
FIG. 18 shows top views of various exemplary embodiments of the inventive clamping elements in which the recesses are on the inside edge.

FIG. 18 illustrates various possibilities of inventive clamping elements with a central opening 170, where the recesses 171 are formed in the inside edge, that is, at the edge of the central opening 170. The recesses, which can be uniform or nonuniform in shape, are provided with undercuts according to the invention, wherein the undercuts are indicated by broken lines.

Figure 19:
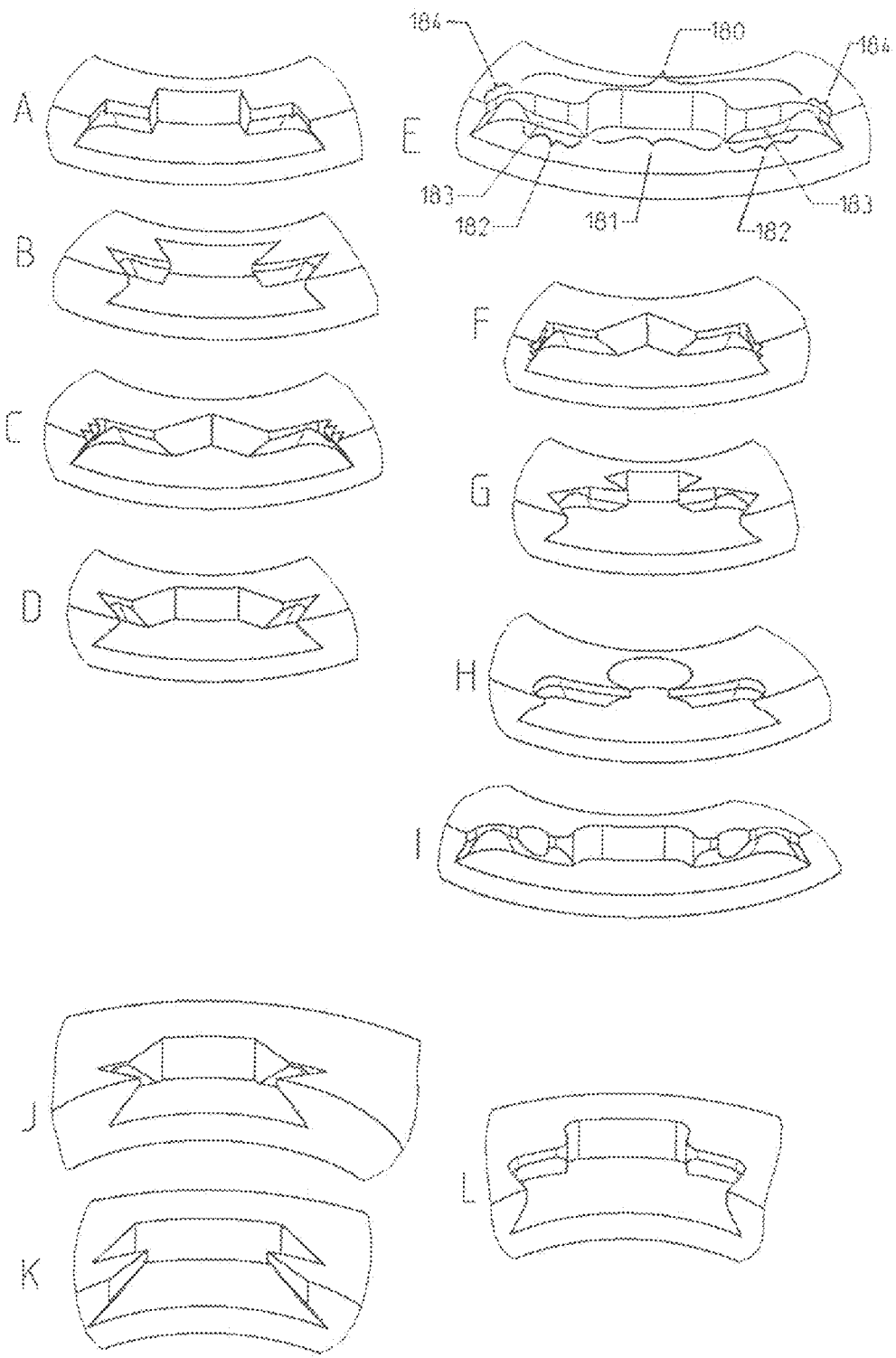
FIG. 19 shows isometric views of various embodiments of undercut profiles.

FIG. 19 shows various examples of undercut profiles in recesses in the outside edge (A-I) and in recesses in the inside edge (J-L) of inventive clamping nuts or of inventive clamping elements. As can be seen by way of example in diagram E, the closed long side 180 of the recess comprises a central section 181 with a profile which is right-angled with respect to the end face of the clamping nut. The sections 182 located to the right and to the left of this comprise undercuts 183. In the embodiments shown here, the narrow sides 184 of the recesses are also provided with undercuts. These types of undercut profiles can be arranged both on the outside edge and also on the inside edge.

Figure 20:
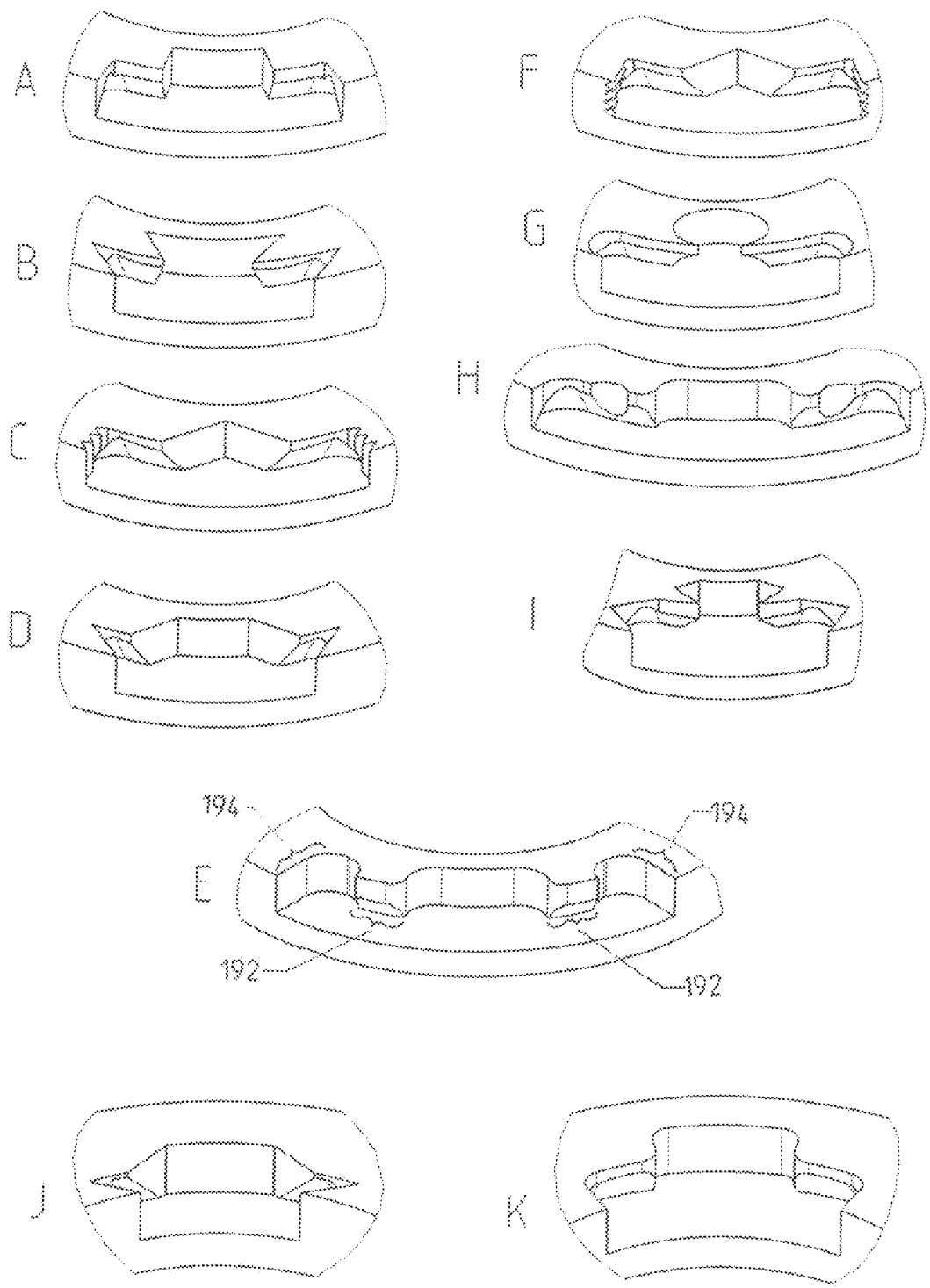
FIG. 20 shows isometric views of various additional exemplary embodiments of undercut profiles.

FIG. 20 shows additional examples of inventive undercut profiles, which can be provided on the outside edge (A-I) or on the inside edge (J-K). In these examples, only the sections 192 are provided with undercuts, whereas the narrow sides 194 of the recesses comprise essentially no undercuts but rather show a right-angled profile in relation to the end face of the clamping element.

Figure 21:
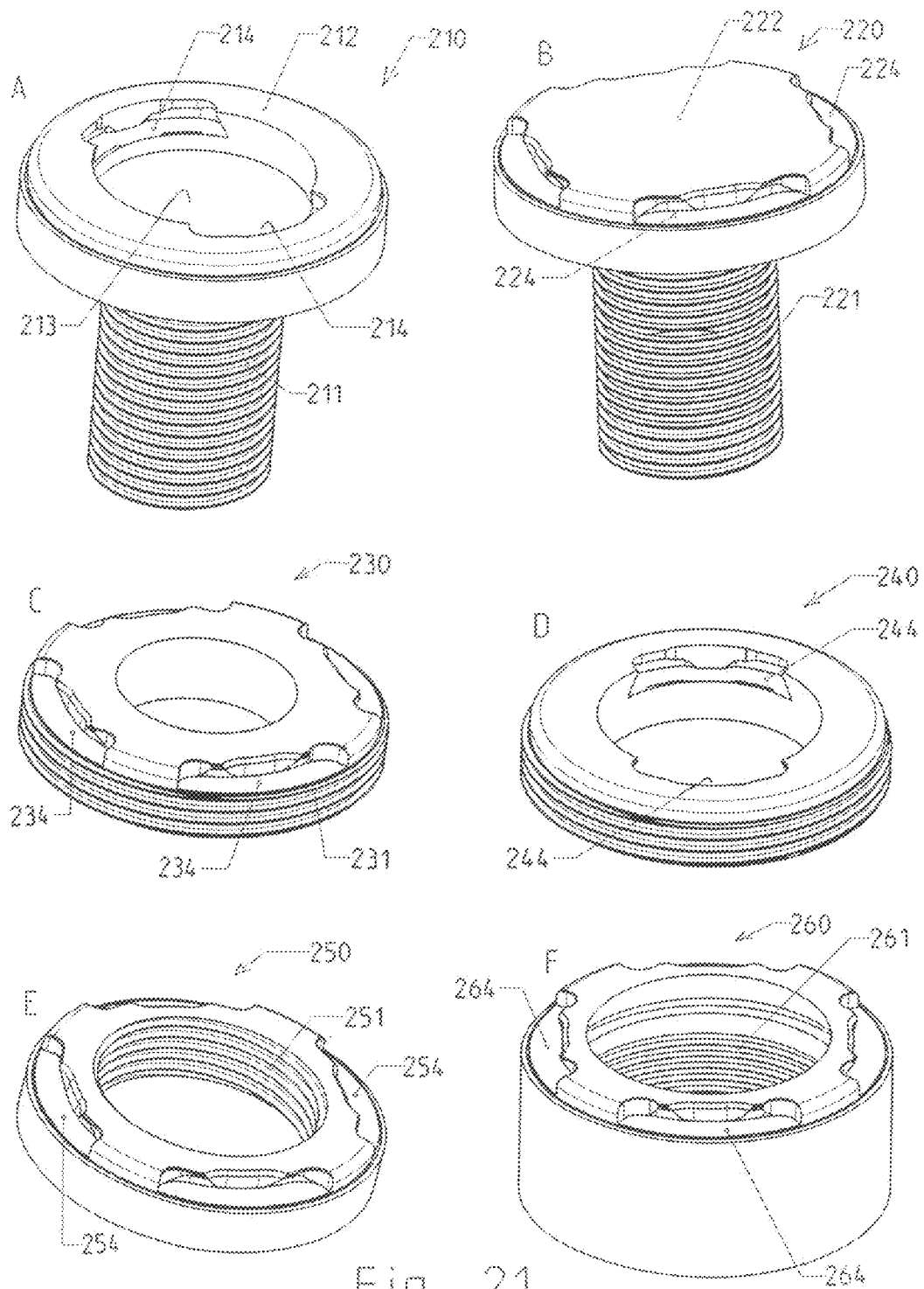
FIG. 21 shows various examples of inventive clamping elements.

FIG. 21 shows various examples of clamping elements designed with undercut profiles according to the invention. For example, diagram A shows a screw 210 with a thread 211 and a screw head 212. The head 212 of the screw comprises a central blind hole 213, wherein two opposing recesses 214 with an inventive undercut profile are arranged on the inner edge formed by the blind hole 213. Diagram B shows another screw 220 with a thread 221 and a head part 222. Four recesses 224 with inventive undercut profiles are provided on the outside circumference or outside edge of the head part 222. Diagram C shows a clamping ring 230 with recesses 234 on the outside edge, the recesses being equipped with an inventive undercut profile. The clamping ring 230 comprises an outside thread. Diagram D shows another clamping ring 240, which is equipped with two recesses 244 on the inside edge with inventive undercut profiles. These types of clamping rings 230 and 240 are used, for example, to particular advantage for the installation of sets of ball bearings in machine spindles, for example, to make possible a pretensioning of the ball bearing in a very space-saving manner. Diagrams E and F show clamping nuts 250 and 260, each with one or more inside threads 251 and 261. Recesses 254 and 264 on the outside edge with inventive undercut profiles are arranged on the end face of the clamping nuts. These types of clamping nuts 250, 260 can be used to particular advantage in the longitudinal turning field or, for example, for furniture manufacturing, in order, in a space-saving manner, to grip a nut with a wrench and, for example, to clamp a collet chuck in the case of multi-spindle boring heads and assemblies with very closely spaced spindles.

Both the clamping elements, especially the clamping nuts, and the wrenches can be produced as castings. The recesses and especially the undercuts can be fabricated by known methods, especially with the use of computer-aided machining processes on CNC machines or by the lost-wax casting or high pressure die-casting process.

The invention claimed is:

1. A clamping system, comprising: a clamping nut; and a wrench for tightening and loosening the clamping nut, wherein the clamping nut comprises an end face having an inside edge and an outside edge, and at least one recess to accept at least one projection of the wrench, wherein the at least one recess is on the outside edge or on the inside edge, and the end face is closed on an opposite edge, and wherein the at least one recess is provided with at least one undercut to be gripped from underneath by the at least one projection of the wrench.

2. The clamping system according to claim 1, wherein the at least one recess in the end face of the clamping nut comprises two narrow sides and two long sides, one long side being closed and one long side being open, wherein the narrow sides of the recess do not comprise undercuts.

3. The clamping system according to claim 2, wherein each of the narrow sides comprises an opening expanded into the shape of part of a circle or some other shape.

4. The clamping system according to claim 1, wherein the at least one recess in the end face of the clamping nut comprises two narrow sides and two long sides, one long side being closed and one long side being open, wherein the closed long side of the recess comprises a central section without an undercut and two sections with undercuts.

5. The clamping system according to claim 4, wherein, in an area of the central section without an undercut, the recess, in cases where the recess is arranged on the outside edge, comprises an opening having a size that increases in a radially inward direction and, in cases where the recess is arranged on the inside edge, an opening having a size that increases in a radially outward direction.

6. The clamping system according to claim 1, wherein the at least one projection of the wrench comprises lateral surfaces which comprise flat sections and sections with an undercut profile complementary to a profile of the recesses in the clamping nut.

7. The clamping system according to claim 1, wherein the at least one projection of the wrench is smaller than the at least one recess of the clamping nut.

8. The clamping system according to claim 1, wherein the clamping nut comprises at least two recesses.

9. The clamping system according to claim 1, wherein the clamping nut comprises an outside thread and/or an inside thread.

10. The clamping system according to claim 1, and further comprising a collet chuck that cooperates with the clamping nut to clamp a tool shaft into a tool holder of a machine tool.

11. A mechanical clamping element with at least one recess provided with an undercut profile for slip-proof engagement of a clamping tool, wherein the at least one recess comprises two narrow sides and two long sides, one long side being closed and one long side being open, wherein the two narrow sides are formed without undercuts, and the closed long side is formed with at least one undercut.

12. The clamping element according to claim 11, wherein the narrow sides comprise an opening that expands in the form of part of a circle or some other shape.

13. The clamping element according to claim 11, wherein the closed long side of the recess comprises a central section without an undercut and two sections with undercuts.

14. The clamping element according to claim 13, wherein, in an area of the central section without an undercut, the recess comprises an enlarged opening.

15. An undercut profile for a mechanical clamping element having a recess with two narrow sides and one closed long side and one open long side, wherein the profile on the narrow sides comprises no undercut, and the profile on the closed long side comprises at least one undercut.

16. The undercut profile according to claim 15, wherein the narrow sides comprise an opening that expands to form part of a circle or some other shape.

17. The undercut profile according to claim 15, wherein the profile on the long side comprises a central section without an undercut and two sections with undercuts.

18. The undercut profile according to claim 17, wherein, in an area of the central section without an undercut, the recess comprises an enlarged opening.

* * * * *